United States Patent [19]

Mathews et al.

[11] Patent Number: 5,440,202
[45] Date of Patent: Aug. 8, 1995

[54] ELECTRON BEAM DEVICE HAVING A DIRECT CURRENT FEED WITH SWITCHING STAGES THEREIN

[75] Inventors: Hans-Günter Mathews, Oberehrendingen, Switzerland; Wolfram Schminke, Laufenburg, Germany

[73] Assignee: Thomcast AG, Turgi, Switzerland

[21] Appl. No.: 30,889

[22] Filed: Mar. 12, 1993

[30] Foreign Application Priority Data

Mar. 28, 1992 [DE] Germany .................. 42 10 294.4

[51] Int. Cl.⁶ .......................................... H01J 23/34
[52] U.S. Cl. ................................... 315/3; 315/5.380
[58] Field of Search ............................ 315/3, 5.38

[56] References Cited

U.S. PATENT DOCUMENTS

| | | | |
|---|---|---|---|
| 3,526,805 | 9/1970 | Okoshi et al. | 315/5.38 |
| 3,644,778 | 2/1972 | Mihran et al. | 315/5.38 |
| 4,101,804 | 7/1978 | Carlsson | 315/5.38 X |
| 4,323,853 | 4/1982 | Kurokawa | 330/43 |
| 4,866,344 | 9/1989 | Ross et al. | 315/3.5 |

FOREIGN PATENT DOCUMENTS

| | | | |
|---|---|---|---|
| 3610524 | 10/1987 | Germany | 315/3.5 |
| 116002 | 10/1978 | Japan | 315/5.38 |

OTHER PUBLICATIONS

G. Palz, et al., Siemens-Zeitschrift 50, 1976, pp. 446–450. "Stromversorgungs einheiten fur Ric htfunk-Wanderfeldrohren".

L. Elias, IEEE Journal of Quantum Electronics, vol. QE-23, No. 9, Sep. 1987, pp. 1470–1475 "Free-Electron Laser Research at the University of California, Santa Barbara".

M. Kawai, et al., J. Appl. Phys. vol. 66, No. 7, Oct. 1989, pp. 2789–2793. "Development and quality measurements of cold relativistic electron beam for low-Y free-electron lasers".

H.-G. Mathews, Journal de Physique, Jan. 1989, pp. C1-643-C1-658. "Gyrotrons for ECR Ion".

*Primary Examiner*—Benny T. Lee
*Attorney, Agent, or Firm*—Oblon, Spivak, McClelland, Maier & Neustadt

[57] ABSTRACT

In an electron beam device having a cathode (1), in which a high-power electron beam propagating along a beam axis (5) is generated, an anode (3) arranged behind the cathode (1) in the direction of beam axis (5), and a collector (4), arranged behind the anode (3) in the direction of the beam axis (5), for decelerating the electrons of the electron beam, the collector (4) is constructed of several collector stages (6) which are arranged successively in the direction of the beam axis (5) and which successively decrease in potential. A high-voltage direct-current supply (13), which consists of a series of similar switching stages (S1, ..., S6) which are in each case constructed as switchable medium-voltage sources and the outputs of which are connected in series, is provided for the feed arrangement. The potentials of the collector stages (6) are provided by corresponding taps between the switching stages (S1, ..., S6) of the high-voltage direct-current supply (13).

10 Claims, 4 Drawing Sheets

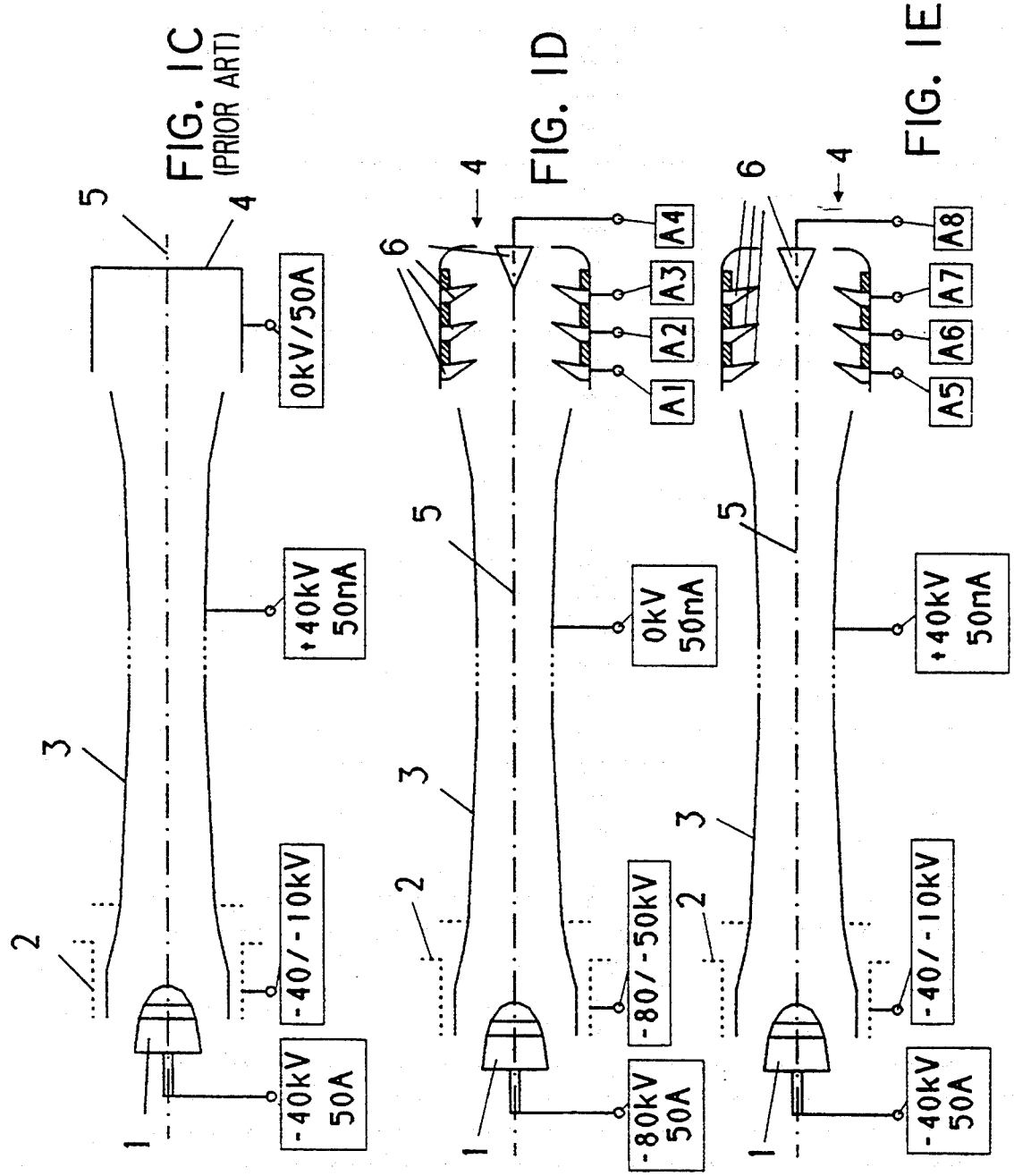

ELECTRON BEAM DEVICE HAVING A DIRECT CURRENT FEED WITH SWITCHING STAGES THEREIN

BACKGROUND OF THE INVENTION

1. Field of the Invention

The present invention relates to an electron beam device comprising (a) a cathode which is at a cathode potential and in which a high-power electron beam propagating along a beam axis is generated;

(b) an anode arranged behind the cathode in the direction of the beam axis, which is at an anode potential which is increased compared with the cathode potential and accelerates the electrons of the electron beam;

(c) a collector arranged behind the anode in the direction of the beam axis for decelerating the electrons of the electron beam, the collector being at a collector potential which is lower than the anode potential; and (d) a feed arrangement for providing the individual potentials for the cathode, anode and the collector.

Such an electron beam device is known, for example, as a quasi-optical gyrotron with a "depressed collector" from the Article by H.-G. Mathews, J. de Physique, Colloque C1, supplement au no. 1, Tome 50, January 1989, pages C1-643 to C1-658 (in particular, see FIG. 11 in this document).

2. Discussion of Background

Feed arrangements for high-power gyrotron tubes are used, for example, for plasma heating in plasma fusion experiments (ECRH=Electron Cyclotron Resonance Heating) at present mainly operate with a system of high-tension transformer, rectifier, tube modulator and capacitor bank. To protect the gyrotron tube, a series circuit of ignitrons is also used as a "crowbar", which limits or destroys the energy stored in the system. A high-power tetrode such as that offered commercially by, for example, Asea Brown Boveri AG under the type number CQK 200-4, has been successful as switching and regulating tube.

Currently used gyrotron tubes such as, for example, the GT 92-5p type, also manufactured and offered by Asea Brown Boveri AG, operate with cathode voltages of up to −90 kV and currents of up to 50 A which must be provided by the feed arrangement. In individual cases, feed arrangements are also used which supply up to 3 gyrotron tubes at the same time.

To turn the gyrotron tube off or on, a separate low-power tube modulator is used in the prior art, which switches the auxiliary or modulation anode between 0 and approx. +30 kV with respect to the cathode potential. Gyrotron tubes without an auxiliary anode are also used, the modulation in this case being limited by the switching speed of the high-power cathode modulator.

To increase their efficiency, gyrotron tubes of the next generation will be equipped with a so-called "depressed collector" described in the printed document mentioned initially, the potential of which is lowered with respect to the anode and which, as an electron collector, decelerates the electrons of the high-power electron beam before it is dissipated.

A desirable feature with respect to the efficiency would be a division of the collector into several collector stages arranged successively which would in each case be on a lower potential step. However, this would require high-power high-tension feed arrangements for supplying the individual collector stages which could only be implemented at great expense by means of the high-voltage tube modulators used in the prior art.

SUMMARY OF THE INVENTION

Accordingly, one object of the invention is to develop electron beam devices of the type initially mentioned in such a manner that they exhibit reduced technical complexity and increased reliability and safety, the efficiency being improved at the same time.

In a device of the type initially mentioned, this object is achieved by the fact that (e) the collector comprises several collector stages arranged successively in the direction of the beam axis, which are in each case on a lower potential step;

(f) the feed arrangement comprises a high-voltage direct-current supply which consists of a plurality of similar switching stages which are in each case constructed as switchable medium-voltage sources and the outputs of which are connected in series; and (g) the stepped potentials of the collector stages are provided by corresponding taps between the switching stages of the high-voltage direct-current supply.

The core of the invention consists of providing as a feed arrangement for the collector stages a series circuit of switchable medium-voltage sources which, on the one hand, can be easily designed in semiconductor technology and, on the other hand, provide different potentials in a simple manner by means of taps between the stages. In addition, the switchability of the individual stages provides for fast disconnection of the entire feed arrangement in the case of an emergency without requiring additional "crowbar" circuits.

A preferred embodiment of the device according to the invention is characterized by the fact that (a) each of the switching stages comprises the secondary winding of a line transformer, a switching stage rectifier connected thereto, subsequent means for smoothing the rectified voltage and at least one switching stage switch located at the output and controlled by a stage controller; and (b) a reversely polarized cascade diode is arranged in each case between the outputs of each switching stage.

This results in a feed arrangement which, in another design and operating mode, has already been successful as a high-voltage direct-current supply for the neutral particle injection in plasma experiments (see also EP-B1-0,134,505) and as pulse step modulator (PSM) in broadcast transmitters.

Further embodiments are obtained from the appended claims.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 1c shows a diagrammatic arrangement, corresponding to the FIGS. 1a, 1b, for a gyrotron tube with 1-stage "depressed collector" of the prior art;

FIGS. 1d, 1e show diagrammatic arrangements of the electrodes with their associated connected voltage and current values in two connection variants for gyrotron tubes having a multi-stage collector, which are the subject-matter of the invention;

DESCRIPTION OF THE PREFERRED EMBODIMENTS

Figure 1A:
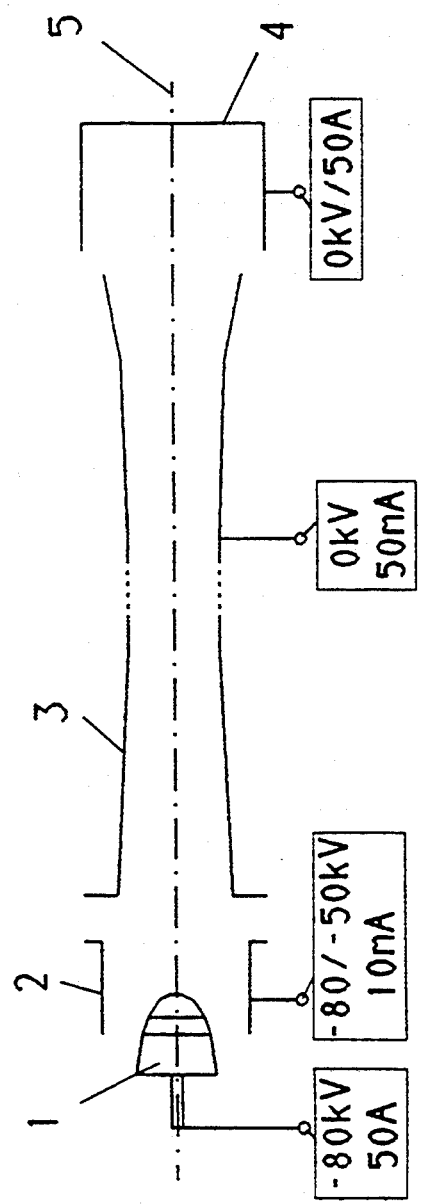
FIGS. 1a, 1b show diagrammatic arrangements of the electrodes with their associated connected voltage and current values for gyrotron tubes of the prior art.

Referring now to the drawings, wherein like reference numerals designate identical or corresponding parts throughout several views, the invention will be explained without restricting its general applicability in connection with gyrotrons. However, it can be generally used in all devices in which a high-power electron beam is generated, guided along a beam axis and is decelerated again in a collector and is dissipated. It can thus also be applied to other high-power microwave tubes, particularly klystrons and free-electron lasers (FEL).

Figure 1B:
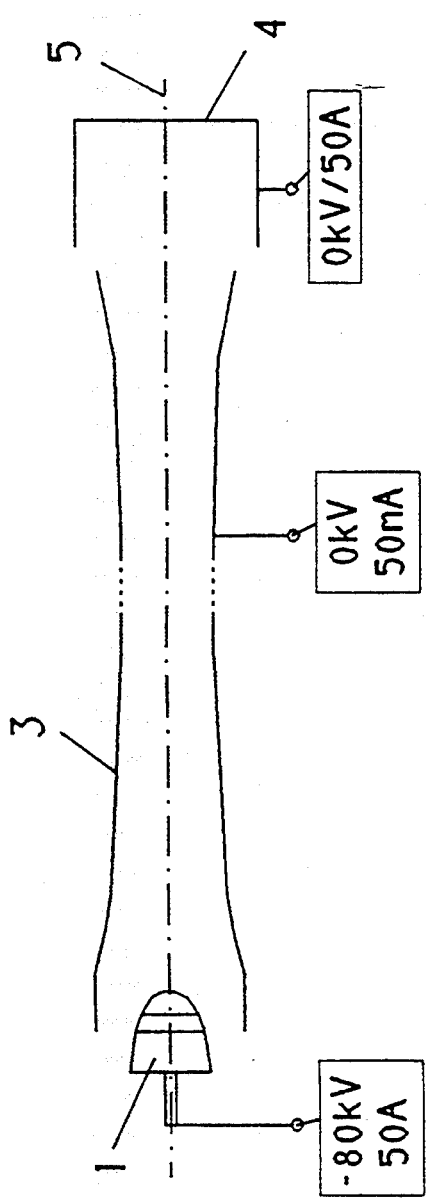

As is shown in the diagrammatic arrangement of FIGS. 1a or 1b, a cathode 1 (for example in the form of a ring cathode), an anode 3 (as main anode) and a collector 4 (as electron collector) are arranged successively along a beam axis 5 in an evacuated space in a gyrotron of the conventional type. Instead of an anode 3 going through to the cathode 1 (FIG. 1b), the anode 3 can be shortened at the cathode end and can be supplemented by a separate auxiliary anode 2 (FIG. 1a). Both variants are also possible in the other FIGS. 1c–1e and are indicated by dashed lines.

Exemplary connected values, that is to say voltages and currents, of the individual electrodes are specified in the associated boxes in the Figures: in FIG. 1a (with the auxiliary anode 2 as modulation anode), the cathode 1 is at a potential of −80 kV with a current of 50 A, the auxiliary anode is switchably connected to potentials of −80 kV or −50 kV (with approx. 10 mA current), the anode 3, like the collector 4, is at the zero potential, the anode drawing only approx. 50 mA but the collector drawing a 50 A current. Naturally, in the gyrotron without an auxiliary anode according to FIG. 1b, the connected value of this electrode is missing; the connected values of the other electrodes, in contrast, are unchanged.

In the gyrotron arrangement according to FIG. 1c, which is also known from FIG. 11 of the printed document initially mentioned, the potential difference between cathode 1 and anode 3 is again 80 kV. The cathode 1 is at a potential of −40 KV with a current of 50A, the auxiliary anode 2 is switchably connected to potentials of −40 KV and −10 KV, the anode 3 is at a potential of 40 KV with a current of 50 mA, and the collector 4 is at a potential of 0 KV with a current of 50A. The (1-stage) collector 4, however, is in this case not at anode potential but its potential is between that of the anode and of the cathode. It thus decelerates the electrons in the electron beam and is called a "depressed collector" because of its lowered potential.

An exemplary arrangement of a gyrotron according to the invention is reproduced in FIGS. 1d and 1e, the two Figures (analogously to FIGS. 1a and 1c) only differing by different connected values at the individual electrodes. The collector 4 is no longer a 1-stage collector in this case but comprises several (in this case four) collector stages 6 which are partially constructed as rings and partially as a conical collector. In the case of FIG. 1d, the cathode 1 is at a potential of −80 KV with a current of 50A, the auxiliary anode 2 is switchably connected to potentials of −80 KV and −50 KV, and the anode 3 is at a potential of 0 KV with a current of 50 mA, while the collector stages 6 have the stepped connected values A1, A2, A3 and A4, which are associated with potentials of, for example, −40, −50, −60 and −80 kV and currents of 15, 20, 10 and 5 A, respectively. In the case of FIG. 1e, the cathode 1 is at a potential of −40 KV with a current of 50A, the auxiliary anode 2 is switchably connected to potentials of −40 KV and −10 KV, and the anode 3 is at a potential of 40 KV with a current of 50 mA, while; the corresponding stepped connected values are designated by A5, A6, A7 and A8 and are linked to potentials of 0, −10, −20 and −40 kV and currents of again 15, 20, 10 and 5 A, respectively.

Figure 2:
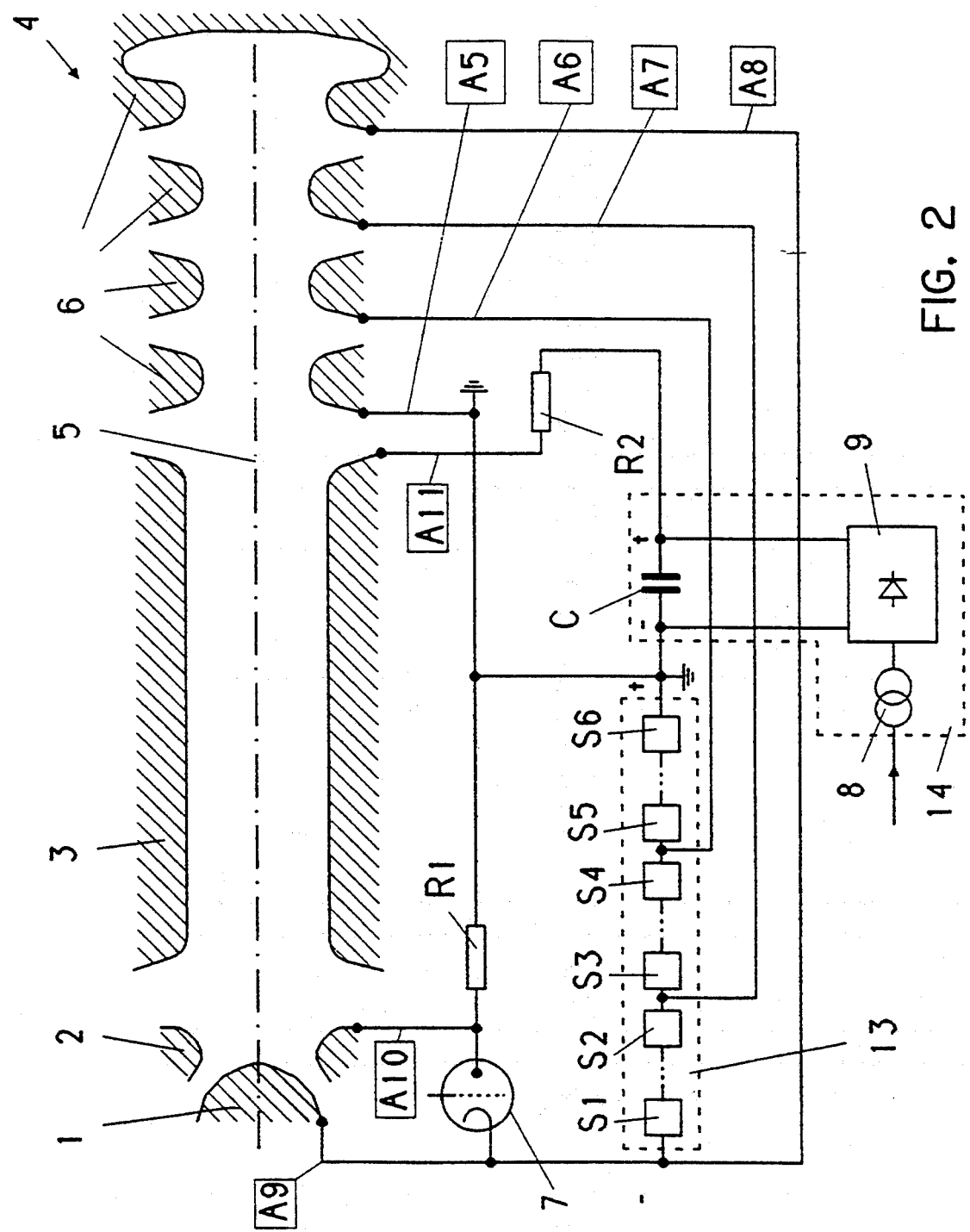
FIG. 2 shows the circuit diagram of an exemplary embodiment of a device according to the invention comprising a feed arrangement, consisting of series-connected switching stages, for the collector stages.

A preferred exemplary embodiment of the invention in the form of a gyrotron according to FIG. 1e with an associated feed arrangement is shown in FIG. 2. The feed arrangement for supplying the electrodes 1, 2, 3 and 4 (with collector stages 6) comprises, on the one hand, a conventional supply section 14 which is constructed of a line transformer 8 connected to the power line, followed by a rectifier 9 and a capacitor C for smoothing. This conventional supply section 14 supplies a constant direct voltage which is between the first of the four collector stages 6 (with connected value A5), which is connected to ground, and the anode 3 (connected value A11; e.g. +40 kV, 50 mA according to FIG. 1e) and positively biases the anode 3 with respect to collector 4. The anode current is limited by a resistor R2.

The feed arrangement comprises, on the other hand, a high-tension direct-current supply 13 which consists of a plurality of similar switching stages S1, S2, S3, S4, S5, S6 which are in each case constructed as switchable medium-voltage sources and are connected in series with their outputs. This high-tension direct-current supply 13 provides the stepped potentials needed for the collector stages 6 by means of its actual outputs and corresponding taps between its switching stages S1, S2, S3, S4, S5, S6. The positive output of the high-tension direct-current source 13 is connected to the negative output of the conventional section, which is connected to ground as reference potential, the negative output of the high-tension direct-current source 13 is connected at the same time to the cathode 1 and to the last one of the four collector stages 6 (connected values A9 corresponding to −40 kV, 50 A and A8 corresponding to −40 kV, 5 A).

The intermediate connected values A6 and A7 (−10 kV, 20 A and −20 kV, 10 A) for the two center collector stages are provided via two taps which are provided within the high-tension direct-current supply 13, for example between the switching stages S2 and S3 and, respectively, S4 and S5. The auxiliary anode 2 is kept at the reference potential (ground) of the first collector stage or respectively of the positive output of the high-tension direct-current supply 13 via a current-limiting resistor R1. In addition, a switching tube 7 can be provided which pulls the potential of the auxiliary anode 2 to the cathode potential on turn-on. Connected value A10 is thus switchable between the reference potentials of the first collector stage or the positive output of the high-tension direct-current supply 13 and the cathode potential A9.

Figure 3:
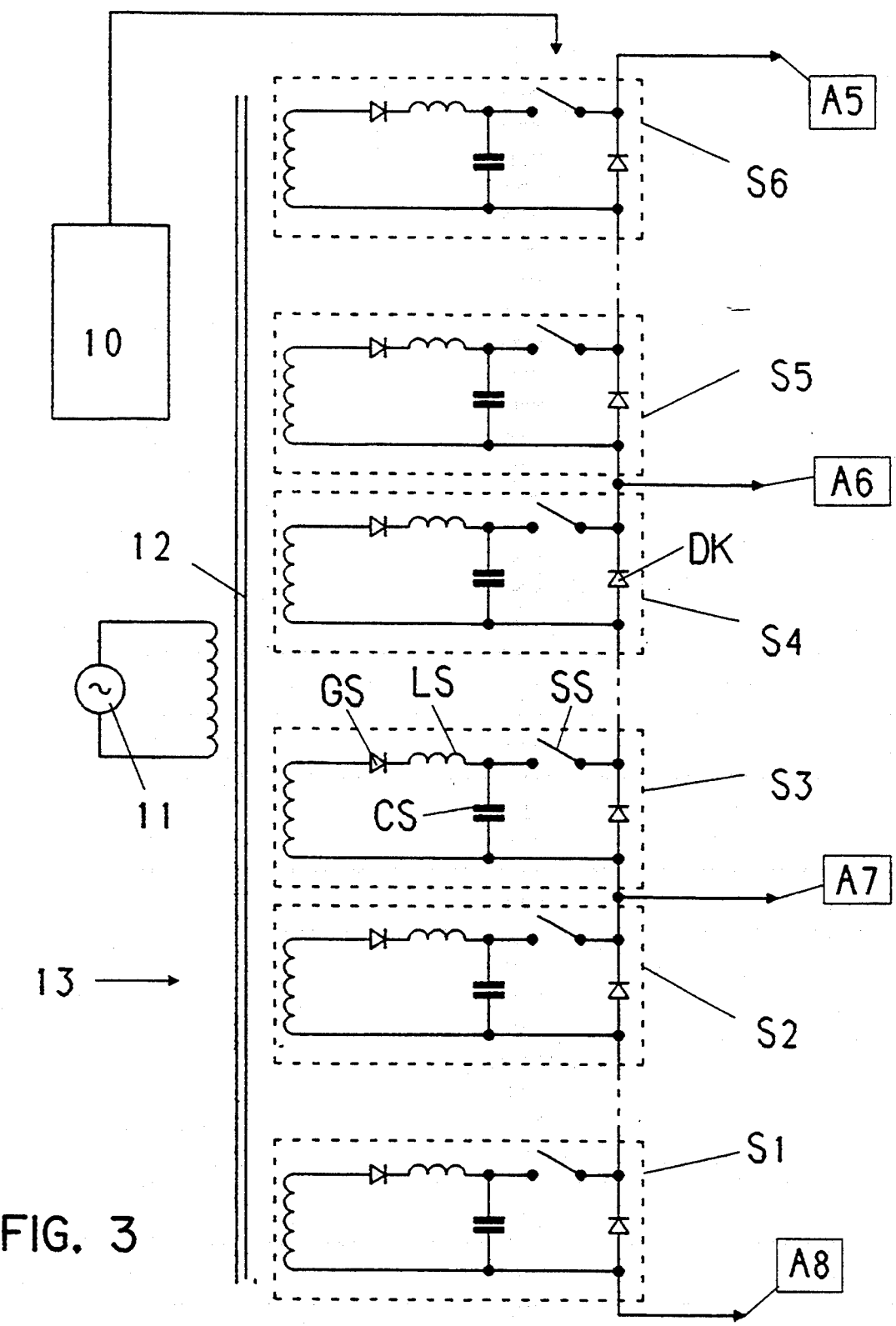
FIG. 3 shows an embodiment of the feed arrangement for the collector stages according to FIG. 3.

The high-tension direct-current supply 13 provides the various potentials (connected values) needed for the stage collector with little circuit complexity and can be rapidly switched on and off when needed so that both additional "crowbar" circuits and modulation tubes can be omitted. A preferred exemplary embodiment of the internal structure of a high-voltage direct-current supply 13 according to FIG. 2 is shown in FIG. 3: the individual switching stages S1, S2, S3, S4, S5, S6 are switchable medium-voltage sources which are supplied from an alternating-voltage source 11 (the line system) via a line transformer 12 with a primary winding and a plurality of secondary windings.

Each of the similar switching stages S1, S2, S3, S4, S5, S6 comprises a switching stage rectifier GS connected to the associated secondary winding, which is followed by means for smoothing, for example a series-connected switching stage inductor LS and a parallel-connected switching stage capacitor CS. A controllable switching stage switch SS, preferably a power semiconductor in the form of a GTO (Gate Turn-Off Thyristor) or IGBT (Insulated Gate Bipolar Transistor), is provided in at least one of the direct-voltage outputs. The totality of the switching stage switches SS is selected by a stage controller 10.

The individual switching stages S1, S2, S3, S4, S5, S6 are connected in series with their direct-voltage outputs, a reversely polarized cascade diode DK being in each case arranged as freewheeling diode between the outputs of a switching stage. The direct voltages of the individual switching stages S1, S2, S3, S4, S5, S6 (e.g. 1–10 kV) then add up to form a total output voltage (of, e.g. 40 kV). Various voltages Changing with time can be preset at the outputs and intermediate taps by optionally switching on various switching stages. A reliable rapid disconnection is achieved by the fact that the switching stage switches SS are opened simultaneously in all switching stages S1, S2, S3, S4, S5, S6 by the stage controller 10.

It should be noted at this point that, naturally, the supply section 14 in FIG. 2 can also be omitted. The positive output of the high-tension direct-current supply 13 is then connected directly to the anode 3 and is at the same time at ground potential.

Overall, the device according to the invention results in the following advantages:
- no additional "crowbar" circuit is necessary for reliable disconnection in an emergency;
- the high-tension direct-current supply allows rapid connection and disconnection within a few ($\approx 20$) microseconds;
- the high-tension direct-current supply potential can float because of its DC isolation;
- the device has very high efficiency;
- the circuit configuration is modular and comparatively simple.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electron beam device, comprising:
   a cathode, an anode, and a collector arranged successively along a beam axis within an evacuated space; and
   a feed arrangement connected to and providing potentials for said cathode, said anode, and said collector, wherein:
   said cathode is at a cathode potential and generates, in response thereto, a high-power electron beam propagating along said beam axis;
   said anode is at an anode potential which is higher than said cathode potential and accelerates, in response thereto, electrons of said high-power electron beam;
   said collector comprises several collector stages arranged successively along said beam axis, said collector stages having successively decreasing potentials, each successively decreasing potential being lower than said anode potential so as to decelerate, in response thereto, said electrons of said high-power electron beam;
   said feed arrangement comprises a high-voltage direct-current supply with a negative and a positive output, said supply consisting of a plurality of identical switching stages, said plurality of switching stages having outputs which are respectively connected in series, and each of said plurality of identical switching stages being a controllable medium-voltage source which can be separately switched on and off via a stage controller; and
   wherein said successively decreasing potentials of said collector stages are provided by connecting said collector stages to respective taps between said switching stages of said high-voltage direct-current supply, said anode potential is provided by connecting said anode to said positive output of said high-voltage direct current supply, and said cathode potential is provided by connecting said cathode to said negative output of said high-voltage direct-current supply.

2. An electron beam device according to claim 1, wherein:
   said high-voltage direct-current supply comprises a line transformer with at least one primary winding and a plurality of secondary windings;
   each of said switching stages is connected to and comprises a respective one of said secondary windings of said line transformer;
   each of said switching stages comprises a respective switching stage rectifier connected to a corresponding secondary winding, respective smoothing means connected to a corresponding switching stage rectifier for smoothing a rectified voltage of said rectifier, and at least one controllable switching stage switch respectively connected to a corresponding smoothing means and said respective at least one switching stage switch being controlled by said stage controller; and
   wherein a respective reversely polarized cascade diode is arranged between outputs of each of said switching stages.

3. An electron beam device according to claim 2, wherein said switching stage switches comprise gate-turn-off power semiconductor components.

4. An electron beam device according to claim 3, wherein said gate-turn-off power semiconductor components are gate-turn-off thyristors.

5. An electron beam device according to claim 3, wherein said gate-turn-off power semiconductor components are insulated gate bipolar transistors.

6. An electron beam device according to any of claims 1–5, wherein:
   said negative output of said high-voltage direct-current supply is connected both to said cathode and to the collector stage which is at a lowest potential among said collector stages;
   a second direct-voltage source is provided with a positive output and a negative output; and
   wherein said positive output of said second direct voltage source is connected to said anode, and said negative output of said second direct voltage source is connected to said negative output of said high-voltage direct-current supply.

7. An electron beam device according to claim 6, wherein said positive output of said high-voltage direct-current supply is connected to said anode and to ground potential.

8. An electron beam device according to claim 7, wherein said high-voltage direct-current supply has a maximum output voltage on the order of 10 kilovolts.

9. An electron beam device according to claim 8, wherein said successively decreasing potentials of said collector stages are between said cathode potential and said anode potential in magnitude.

10. An electron beam device according to claim 9, wherein said electron beam device is one of a gyrotron, a klystron, a free-electron laser, and a high-power microwave tube.

* * * * *